United States Patent [19]

Hirano et al.

[11] Patent Number: 5,979,245
[45] Date of Patent: *Nov. 9, 1999

[54] METHOD OF MEASURING FLUID FLOW BY ANALYZING THE FLUORESCENT EMISSIONS FROM TRACER PARTICLES IN THE FLUID

[75] Inventors: Akira Hirano; Masahide Tsujishita, both of Hyogo-ken; Hisao Ohnishi; Masashi Nishigaki, both of Osaka-fu; Masamichi Ippommatsu; Tsuyoshi Tsurutani, both of Hyogo-ken, all of Japan

[73] Assignees: Osaka Gas Company Limited; Liquid Gas Co., Ltd., both of Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/698,249

[22] Filed: Aug. 14, 1996

Related U.S. Application Data

[63] Continuation of application No. 08/494,741, Jun. 26, 1995, abandoned, which is a continuation of application No. 08/047,314, Apr. 15, 1993, abandoned.

[30] Foreign Application Priority Data

Apr. 17, 1992 [JP] Japan .................................. 4-098088

[51] Int. Cl.$^6$ ...................................................... G01P 5/18
[52] U.S. Cl. ......................................................... 73/861.05
[58] Field of Search ............................... 73/24.01, 24.02, 73/117.2, 117.3, 117.4, 147, 861, 861.05; 250/339, 356.1, 356.2, 362.05; 356/344

[56] References Cited

U.S. PATENT DOCUMENTS

| | | | |
|---|---|---|---|
| 3,835,703 | 9/1974 | Bush | 73/147 |
| 3,938,365 | 2/1976 | Dewey, Jr. | 73/24.02 |
| 4,771,629 | 9/1988 | Carlson et al. | 73/24.02 |
| 4,896,532 | 1/1990 | Schmalz | 73/147 |
| 4,925,296 | 5/1990 | Reichmuth | 73/861.05 |
| 5,127,264 | 7/1992 | Schmalz | 73/147 |
| 5,153,665 | 10/1992 | Weinstein | 73/861.05 |

OTHER PUBLICATIONS

M.A. Northrup et al., Analytica Chimica Acta, 255 (1991) 275–282, Application of fluorescent particle imaging to measuring flow in complex media.

Applied Optics–vol. 30, No. 21, Jul. 1991, New York US pp. 3034–3040, XP216448 M.Northrup et al. 'Flurescent particle image velocimetry: application to flow measurement in refractive index–matched porous media' *p. 3037, left Co., paragraph 1*.

Patent Abstracts of Japan–vol. 14, No. 446 (C763) Sep. 25, 1990 & JP–A–21 75 786 ( Kasei Optonix ) *abstract*.

Patent Abstracts of Japan–vol. 14, No. 443 (C–762) Sep. 21, 1990 & JP–A–21 73 181 ( Mitsui Toatsu ) *abstract*.

M.A. Northrup et al., Analytica Chimica Acta, 255 (1991) 275–282, "Application of fluorescent particle imaging to measuring flow in complex media".

*Primary Examiner*—William Oen
*Attorney, Agent, or Firm*—Jordan and Hamburg LLP

[57] ABSTRACT

In the method for measuring the velocity of fluid or visualizing the distribution of fluid by feeding tracer particles to the fluid, irradiating the fluid with light and observing return light from the tracer particles, tracer particles containing a fluorescent substance are fed at least partially to the fluid and the fluid is irradiated with exciting light to cause the tracer particles to output fluorescent emissions. A filter which does not transmit the exciting light is used to substantially selectively observe the fluorescent emissions of the tracer particles. This method results in a remarkable improvement in the accuracy of flow velocity measurement or visualization of fluid distribution. Moreover, in a mixed fluid system consisting of two or more different fluids, the pattern of behavior of each fluid and the intermingled state of the fluids can be observed by using a plurality of different tracer particles.

5 Claims, 4 Drawing Sheets ized in US 5,979,245

METHOD OF MEASURING FLUID FLOW BY ANALYZING THE FLUORESCENT EMISSIONS FROM TRACER PARTICLES IN THE FLUID

This application is a continuation of application Ser. No. 08/494,741 filed Jun. 26, 1995, now abandoned, which is a continuation of application Ser. No. 08/047,314 filed Apr. 15, 1993, now abandoned.

BACKGROUND OF THE INVENTION

The present invention relates to a method for measuring the flow of fluids and more particularly to a method for measuring the velocity of fluid flow or visualizing the distribution (behavior) of a fluid or an intermingled state of two or more different fluids in an engine combustion chamber, a silencer, heat exchanger or the like.

For measurement of the velocity of fluid flow or visualization of the pattern of fluid flow within a confined space such as a pipe for observation of the state of flow, there are known laser Doppler velocimetry (LDV) (using a laser Doppler flowmeter) and particle imaging velocimetry (PIV) (photographing and image processing).

LDV is a method of measuring the flow of a fluid which comprises loading the fluid with tracer particles, projecting two laser beams against the fluid so as to form an interference figure known as "fringe" at the converging point of the beams and observing the scattered light produced as the tracer particles pass through that fringe.

In this method, however, windows of high parallelism (windows whose inner and outer planes are exactly parallel to each other) must be provided for admission of two incident laser beams and, moreover, the inevitable dead angle results in a locality which cannot be observed in the fluid body. Moreover, beyond all else, there is the problem that only the point of convergence of the two laser beams can be observed at a time (point observation).

PIV is a measuring method which comprises loading the fluid with tracer particles, irradiating the fluid using a continuous emission laser or a pulse laser and measuring the velocity of flow or visualizing the distribution of the fluid by photographing and image processing.

Unlike the method comprising the use of converging laser beams, this method does not require windows of high parallelism nor does it have the problem of a non-observable dead angle and permits a broad range of observation in one operation.

However, the scattered light mentioned above includes not only the light originating from the tracer particles, but also the light scattered by interferring objects such as the laser beam incidence window, observation window, pipe wall and suspended dust particles afloat within the pipe.

In actual observation, all of these scattered lights are observed together and the resulting high noise level (low S/N ratio) discourages attempts to measure fluid flows with high accuracy. Particularly when the scattered light from said interfering objects is high in intensity, it is even impossible to track the very tracer particles.

In observing a mixture of two or more fluids for determining the behaviors of the respective fluids or an intermingled state of the fluids, it is impossible to differentially assign the scattered radiations from tracer particles to the respective fluids. Thus, any method observing Mie scattering is not capable of measuring the flow of fluids of this sort. There may be contemplated to vary the size of tracer particles but since there is no perfectly homogeneous laser beam, it is unscrupulous to estimate the size of tracer particles from the intensity of scattered light alone. Moreover, if the size of particles supplied to the fluid is varied, the particle entrainment pattern is also varied. Therefore, the method would not be rewarded with a commensurate benefit.

SUMMARY OF THE INVENTION

Having been brought into being at the above state of the art, the present invention has for its object to provide a new technology for improving the conventional PIV method to reduce the background noise and insure an improved S/N ratio and more particularly a new method of measuring the flow of fluids with greater accuracy which comprises eliminating the scattered light from interferring objects to a large extent and selectively observing the scattered light from tracer particles.

The method of measuring fluid flows according to the present invention comprises loading the fluid to be measured with tracer particles, irradiating the fluid with light and observing scattered light from said tracer particles to measure the velocity of fluid or visualize the distribution of fluid characterized by using fluorescent tracer particles as said tracer particles, irradiating the fluid with exciting light to cause the tracer particles to produce fluorescent emissions and observing the fluid through a filter which does not transmit said exciting light but selectively transmits said fluorescent emissions to thereby permit a virtually selective observation of the fluorescence.

DETAILED DESCRIPTION OF THE INVENTION

When tracer particles are observed through a filter which does not transmit the exciting light but selectively transmits fluorescent emissions induced by said exciting light as mentioned above, the return light from interfering objects such as the light incidence window, dust, pipe wall, etc. is blocked by said filter so that the light observed is mostly the fluorescent emissions from the tracer particles. As a result, the movement of tracer particles can be clearly observed and the flow measurement error can be minimized (a higher S/N ratio can be realized).

The fluid as the object of measurement is not particularly limited and includes, inter alia, air and other gases inclusive of fuel gas and a variety of liquids such as water, liquefied gases and so on.

The term 'fluorescent tracer particles' is used herein to mean any of (1) porous tracer particles impregnated with a fluorescent substance, (2) tracer particles manufactured from a composition comprising a particle-forming material and a fluorescent substance and (3) tracer particles which are made of a fluorescent material or doped with a fluorescent substance. These kinds of tracer particles are now described in detail. It should be understood that the fluorescent material which can be used in the present invention is any substance that produces fluorescent emissions of wavelengths different from the wavelength of the exciting light to be used.

(1) Tracer Particles Impregnated with a Fluorescent Substance

Porous particles (e.g. porous silica particles) are impregnated with a liquid fluorescent material (e.g. a solution of Rhodamine B in anhydrous alcohol). For this purpose, a vessel is filled with the liquid fluorescent material and the porous particles are immersed for a predetermined time so that the fluorescent material diffuses gradually into the internal voids of the porous particles by capillary action. The positive entrapment of the fluorescent material in the porous particles can be achieved in a reduced time when the air within the vessel is aspirated off with a suitable suction means. The particles saturated with the fluorescent material are then dried and sieved for use as tracer particles. The tracer particles thus obtained are rich in the fluorescent material and high in the quantum yield.

When particles are impregnated with a fluorescent material for use as tracer particles as above, the substrate particles are preferably porous because (1) such particles are highly receptive to the fluorescent material, (2) the impregnated particles are rich in the fluorescent material and high in fluorescent quantum yield so that they can be used for high-velocity fluids (5~20 m/s) and even small-sized particles can be used, and (3) the bulk specific gravity of tracer particles can be decreased.

The void rate of said porous particles is not critical but is preferably about 5 to 95%. If the void rate is less than 5%, the amount of the fluorescent material that can be incorporated will not be large enough for clear observation. On the other hand, if the void rate exceeds 95%, the tracer particles may not have a sufficient mechanical strength.

(2) Tracer Particles Produced by Adding a Fluorescent Material to a Particle-Forming Material A typical process for producing tracer particles of this type comprises dripping an aqueous solution containing both the particle precursor and the fluorescent substance directly into an organic solvent or extruding the solution through an emulsification membrane having a multiplicity of pores of substantially uniform diameter (JP Kokai H-5-240 and H-5-23565) to produce emulsion particles in said organic solvent and harvesting the resulting tracer particles, one particle per emulsion particle.

To be specific, an aqueous solution containing sodium silicate and a fluorescent substance is extruded through a porous glass membrane (e.g. Vycor glass, manufactured by Corning Glass) or a porous polymer membrane (e.g. Neuropore filter, manufactured by GE) into a hexane solution containing a nonionic surfactant, using a nitrogen gas. The emulsion particles produced in large numbers in the hexane solution are then collected and added to an aqueous solution of ammonium bicarbonate. The mixture is allowed to stand for a few hours, after which the particles are recovered by filtration, rinsed, washed with methanol and dried. The particles thus obtained can be used as tracer particles.

(3) Tracer Particles Composed Solely of a Fluorescent Material or Doped with a Fluorescent Substance Particles of lanthanoids such as neodymium (Nd), europium (Eu), terbium (Tb), etc. and their compounds (hydrides, halides, nitrides), alloys of two or more lanthanoid species, rhodamine, coumarin, fluorescein, umbellipherone, eosin, esculin or the like; particles produced by the method described in JP Kokai H-2-173181 (the zinc chloride formed in nonaqueous medium is saturated-with a compound containing a metal acting as a center of light emission, such as copper, manganese, silver, aluminum, gallium or the like, is sintered in fluidizing condition), the particles produced by the method disclosed in JP H-2-175786 (fluorescent particles are mixed with heat-treated alkaline earth metal sulfate particles and the mixture is sintered at 500–1550° C.), and the tracer particles of the conventional type as stained with a fluorescent dye or pigment, such as C.I. Acid yellow 7, C.I. Basic Red 1, etc. can all be used as tracer particles in the present invention.

Furthermore, particles produced by the high-temperature sintering of a composition comprising, as a major ingredient, any of high-purity oxides, sulfides, silicates and tungstates of metals such as zinc, cadmium, calcium, aluminum, yittrium, etc. and, as a minor ingredient, an activator such as manganese, silver, copper, lead, europium, etc. as well as a flux substance, and particles of CaS (activator: Bi, color of emission: violet), ZnS (Ag, Cl, blue), ZnS (Cu, Al, green), ZnS (Mn, orange), ZnS (Cu, yellow green), ZnO (Zn, whitish green), $Y_2O_3$ (Eu, red), $CaWO_4$ (blue green), $MgWO_4$ (blue), $Zn_2SiO_4$ (Mn, green) can also be employed.

When the temperature of the fluid to be measured is high, fluorescent tracer particles not containing an organic compound are preferred. Thus, for example, silica ($SiO_2$) particles doped with neodymium or europium or a compound thereof are used with advantage. These particles show excellent heat resistance and do not melt even when they are added to high-temperature fluids at, for example, 500 to 1500° C.

The configuration of said tracer particles may be non-spherical or spherical but spherical particles are preferred because the individual particles then produce more or less identical emissions to insure an improved measuring accuracy and, moreover, secondary coagulation may be prevented.

The exciting light which can be employed in the present invention is not particularly limited in type and includes, among others, the output of an excimer laser or a nitrogen laser, ultraviolet light, short-wavelength visible light, the output of a $D_2$ lamp or a Hg lamp, visible laser light (YAG/SHG) at 532 nm, Ar ion laser light and other laser beams. The use of a continuously emission laser or a lamp as the light source offers the advantage that the fluorescence can be photographed as a linearly continual pattern.

The filter which can be used in the present invention is not limited in type, only if it is capable of transmitting light of a limited wavelength band. Assuming that the wavelength of the exciting light is 500 nm and the wavelength of the fluorescent emission is about 600 nm, a filter transmitting light of the wavelength about 600±20 nm is employed.

There is no limitation on the type of apparatus for loading the fluid to be measured with the tracer particles. Thus, any of the known devices including a measuring wheel type powder feeder (a rotary powder feeder having a wheel mounted on a vertical rotary shaft and adapted to feed out the tracer particles from said wheel by an air pressure difference between the interior of the apparatus and the atmospheric air) and a screw type powder feeder can be used. However, in terms of feeding accuracy, the measuring wheel powder feeder is preferable.

The intermingled state of a plurality of fluids can be visualized employing a plurality of types of tracer particles. In this measuring system, different fluids to be admixed are respectively loaded beforehand with tracer particles containing fluorescent materials which exhibit different colors of fluorescence. For example, fluid A is loaded with tracer particles A (emission color: green), fluid B with tracer particles B (blue) and fluid C with tracer particles C (red), each in a quantitative proportion, and said fluids are then mixed. The mixed fluid is irradiated with an exciting radiation of the wavelength Xnm to cause the respective tracers to output fluorescent emissions. Through a filter which does not transmit light of the wavelength Xnm but transmits fluorescent emissions from the tracer particles, the above emissions are subjected to image processing with the use of CCD cameras, for instance. By this procedure, the behaviors of the respective tracer particles can be clearly visualized so that the patterns of movements of respective component fluids A, B and C or an intermingled state of fluids A through C can be accurately determined (claim 4).

The present invention permits the use of tracer particles of very small size. The use of smaller tracer particles results in an improved fluid tracking performance and, therefore, in the advantage of reduced measurement error. Thus, in order to attain a sufficiently high S/N ratio, that is to say a sufficiently high intensity of signals from the tracer particles, it was essential, prior to the invention, to employ tracer particles of comparatively large size (for example, 30–50 $\mu$m).

However, such large particles do not follow the movement of fluids faithfully and tend to fall gradually under their own weight. In the present invention, however, the light from the particles can be monitored as mentioned above so that it is no longer necessary to use such large-sized particles. Thus, even by using particles about 1 $\mu$m in diameter, measurement can be made with a high S/N ratio.

The preferred mean size range of tracer particles in the present invention is 0.3 to 10 $\mu$m, although this is not a critical range.

The method of the present invention finds application in the visualization of fluid flow or measurement of the velocity of fluid flow in engine combustion chambers, silencers, heat exchangers and other equipment or devices in which some or other fluid medium (gas or liquid) flows.

The invention can further be used in hydrodynamic experiments (wind tunnel experiments) in the fields of aircraft, motor vehicles, seacraft, high-storied buildings, bridges and so on.

PREFERRED EMBODIMENTS OF THE INVENTION

Production Example 1

The process for producing porous particles prior to impregnation with a fluorescent material is described below. In this production example, the reversed micelle method is employed but this is not an exclusive choice.

A 10 $\mu$m-thick polyimide film was irradiated with a KrF excimer laser (wavelength 251 nm) to provide perforations sized 2.0 $\mu$m. This perforated polymer film was mounted in an emulsification device illustrated in FIG. 4 and an aqueous solution of the tracer precursor substance was fed under pressure into an organic solution with a syringe pump. The feeding rate was 1 g/cm$^2$ and the temperature was 25° C.

Figure 4:
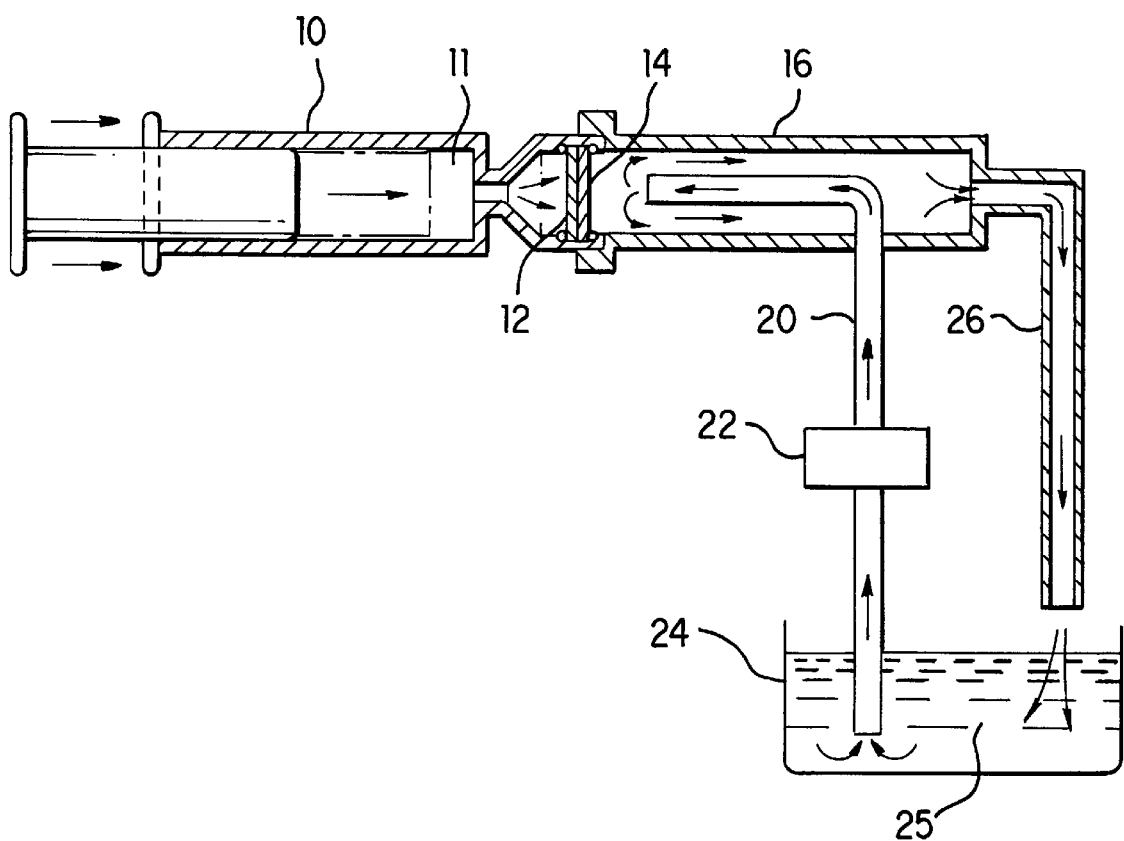
FIG. 4 is a diagrammatic view showing the particle manufacturing equipment used in Production Example 1.

The construction of the device shown in FIG. 4 is summarized below. The reference numeral 10 indicates a volumetric syringe pump 10. The polymer membrane, indicated by 12, is mounted in the forward portion of the volumetric syringe pump. The reference numeral 14 indicates a screen for supporting said polymer membrane. Indicated by the numeral 16 is a cylindrical reactor which is communicating with said syringe pump 10. The reference numeral 20 indicates a feed pipe for feeding an organic solvent 25 from a solvent beaker 24 to said reactor 16 through a metering pump 22. Now, an aqueous solution 11 of the tracer particle precursor substance is quantitatively injected into the organic solvent 25 within the reactor 16 by said syringe pump 10. After formation of a large number of emulsion particles, the organic solvent is returned from the reactor 16 to the solvent beaker 24 via a withdrawal pipe 26.

In the example, a hexane solution of polyoxyethylene (20)-sorbitan trioleate (20 g/l) was used as the organic solvent.

As to the aqueous solution, a solution prepared by adding 1.0 mol of tetraethoxysilane, 2.2 mol of methanol, 1.0 mol of N,N-dimethylformamide and $4 \times 10^{-4}$ mols of ammonia to 10 mols of water was employed.

After emulsification at 5° C., the slurry was refluxed for 30 hours and the resulting emulsion particles (sol) in the organic acid were precipitated by gelation. The precipitate was dried and sintered at 800° C.

In this manner, a multiplicity of porous spherical silica ($SiO_2$) particles were obtained. The particles had a void rate of 50%, a mean diameter of 2.5 $\mu$m and the diameters of 70% of the particles were within the range of 2.7±0.7 $\mu$m.

EXAMPLE 1

In an alcohol solution of Rhodamine B were immersed the particles prepared in Production Example 1 and using a suction device the air within the vessel was aspirated off to let the particles absorb Rhodamine B. The particles were then dried to provide fluorescent tracer particles.

Using a measuring wheel powder feeder (MSF-F, Liquid Gas Co., Ltd.), the fluorescent tracer particles thus obtained were fed to a gas flowing within a round pipe at a flow rate of 20 m/s.

The above-mentioned round pipe is a cylindrical device having a window for incidence of exciting light and an observation window.

From the above window for incidence of exciting light, an exciting light (XeCl excimer laser: 0.2 J/pulse) was projected against the gas flowing in the round pipe and, at the same time, through a filter transmitting light of the wavelength 600±30 nm (Nihon Shinku Kogaku, Ltd.) and an image intensifier (tradename C2925, Hamamatsu Photonics Co., Ltd.), the inside of the round pipe was photographed with a synchronized CCD camera through said observation window for visualization of the gas flow.

It was found that the measurement could be made with an S/N ratio of not less than 40 dB (noise level below 1/100). Thus, mostly the fluorescent light from the tracer particles could be selectively observed and the positions of tracer particles be accurately visualized.

Comparative Example 1

A visualization experiment was performed in the same manner as Example 1 except that the impregnation with a fluorescent material was omitted, an Ar laser (0.2 W/pulse) was used as the exciting light source and a filter transmitting light of the wavelength 510±30 nm was employed.

As a result, the particles were flooded with scattered light from the glass so that the fluid could not be measured accurately (S/N ratio: <20 dB).

EXAMPLE 2

(Experiment 1 in a Mixed Fluid System)

Figure 1:
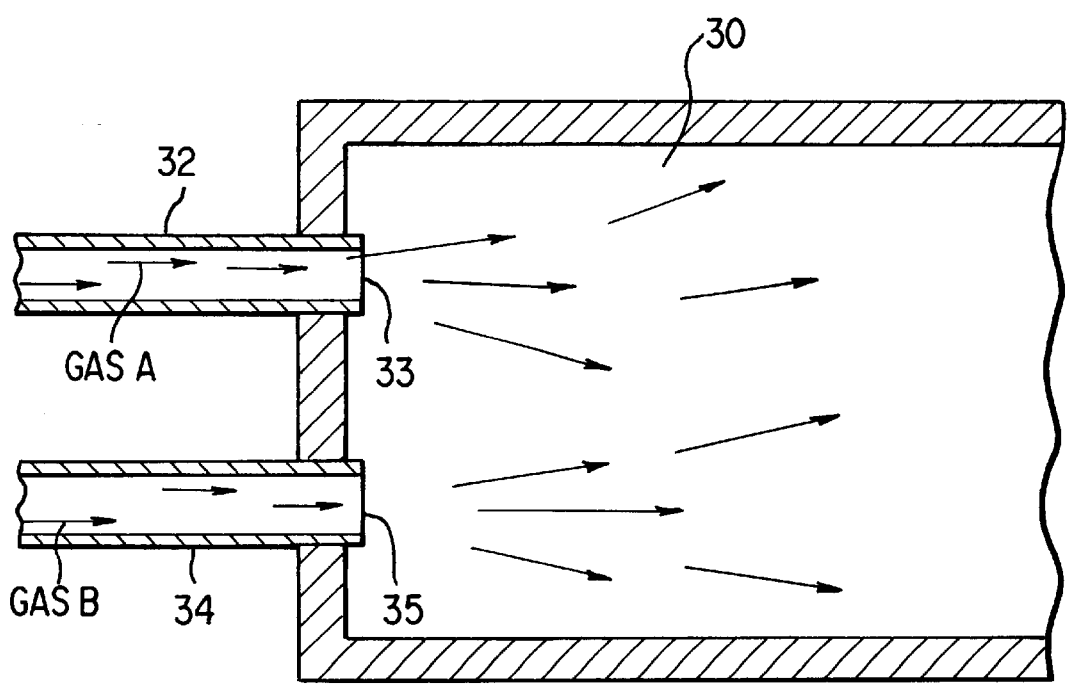
FIG. 1 is a schematic view illustrating the equipment used in Example 2.

FIG. 1 shows a fluid mixing chamber used in this example. This mixing chamber 30 is equipped with a window for incidence of exciting light and an observation window (not shown).

In FIG. 1, the reference numeral 32 represents a first round pipe communicating with said fluid mixing chamber 30 and a gas A is flowing in this first round pipe 32 toward the fluid mixing chamber 30. The reference numeral 33 represents a first injection port and the gas A flowing in the first round pipe 32 is introduced into the fluid mixing chamber 30 from said first injection port 33. The flow rate at this first injection port 33 is 6 m/s.

The reference numeral 34 represents a second round pipe communicating with said fluid mixing chamber 30 and a gas B is flowing in this second round pipe (34) toward the fluid mixing chamber 30. The reference numeral 35 represents a second injection port and the gas B flowing in the second round pipe 34 is introduced into the fluid mixing chamber 30 from said second injection port 35. The flow rate at the second injection port 35 is 7 m/s.

In this manner, gases A and B are intermingled in the fluid mixing chamber 30.

Now, the same tracer particles (particles A) as used in Example 1 were fed to the first round pipe 32. On the other hand, porous spherical silica ($SiO_2$) particles prepared in Production Example 1 were impregnated with coumarin 47 and dried and the tracer particles (particles B) thus obtained are fed to said second round pipe 34. Both the particles A and B were fed from feeders of the type used in Example 1 and the feeding amounts were equal.

Then, from said window for incidence of exciting light, an exciting light (XeCl excimer laser: 0.2 J/pulse) was projected against the mixed fluid flowing in the fluid mixing chamber 30, and through a filter transmitting light of the wavelength 462±17 nm (Nihon Shinku Kogaku) and an image intensifier (tradename C2925, Hamamatsu Photonics), the inside of the fluid mixing chamber 30 was photographed with synchronized CCD cameras through said observation window for visualization of the intermingled state of gases A and B.

Figure 2:
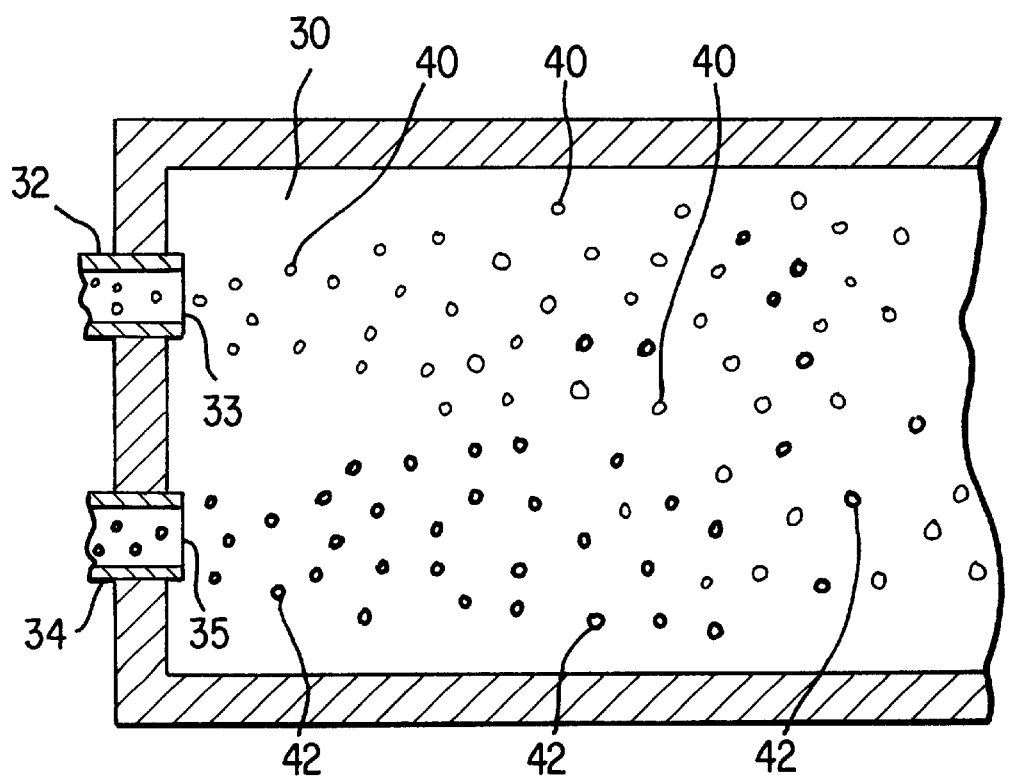
FIG. 2 is a schematic view showing the intermingled state of two different gases in the fluid mixing chamber shown in FIG. 1.

In this manner, the intermingled state of the two different gases could be clearly observed. FIG. 2 is a schematic view showing this condition. In FIG. 2, the reference numeral 40 represents particles A and the numeral 42 represents particles B.

EXAMPLE 3

(Experiment 2 in a Mixed Fluid System)

A visualization experiment was performed in the same manner as Example 2 except that neodymium-treated fluorescent spherical silica particles (mean particle diameter 5 $\mu$m) and europium-treated fluorescent spherical silica particles (mean particle diameter 5 $\mu$m) were used as respective tracers and the fluids were passed at the temperature of 600° C. for each and at the flow rate of 3 m/s each. As a result, the intermingled state of the two different fluids could be clearly observed.

The above fluorescent spherical silica particles were prepared as follows. The large number of porous spherical silica ($SiO_2$) particles having a mean particle diameter of 5 $\mu$m as prepared by the method described in Production Example 1 were immersed in an alcohol solution of neodymium chloride or europium chloride and, then, sintered at 600–800° C.

EXAMPLE 4

(Experiment 3 in a Mixed Fluid System)

Figure 3:
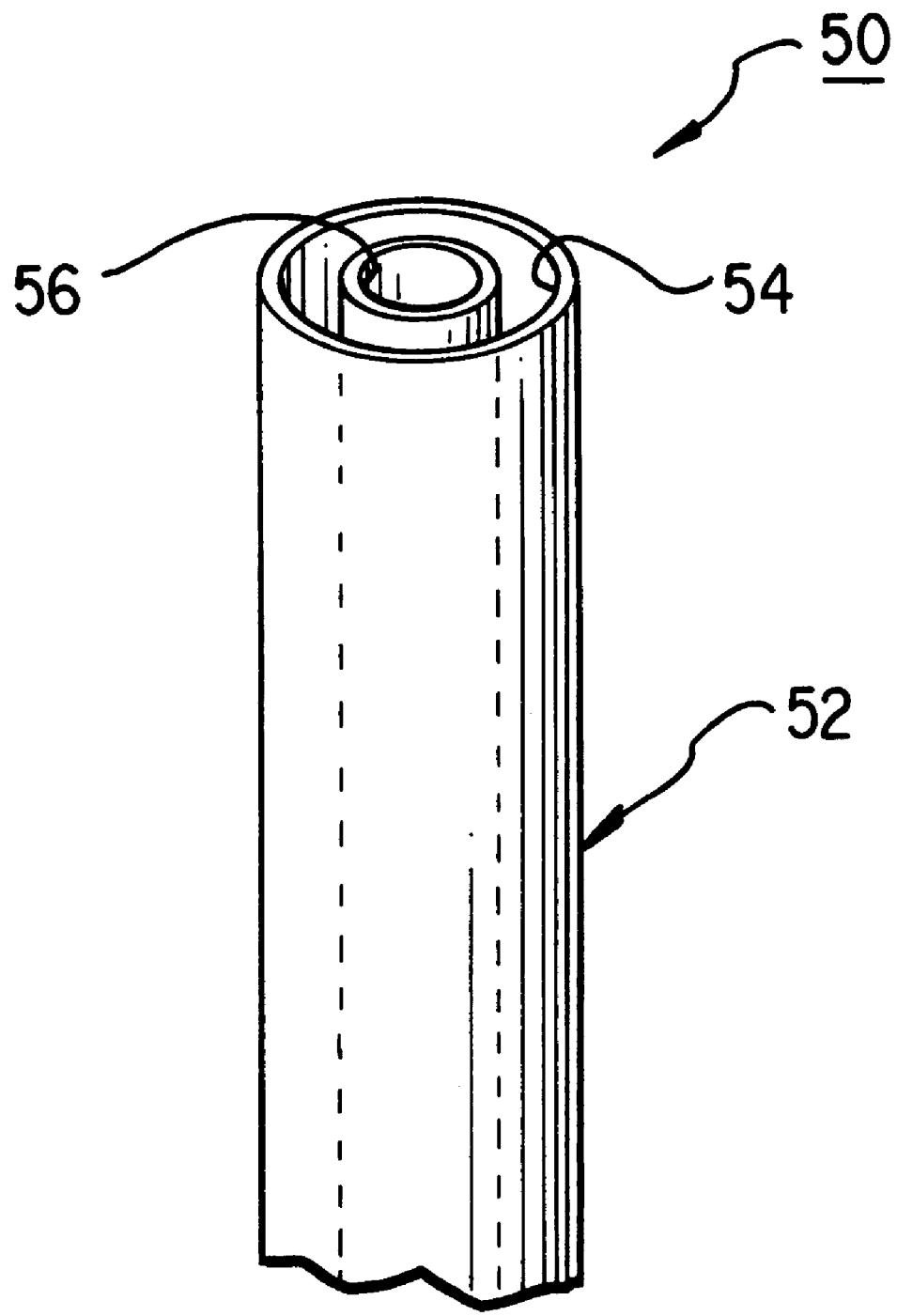
FIG. 3 is a perspective view showing the nozzle of the gas burner used in Example 4.

FIG. 3 shows a nozzle (52) of a gas burner (50). The nozzle (52) is a double-pipe device such that air (gas A) is ejected from its outer pipe 54 and a gaseous mixture of fuel gas and air (gas B) is ejected from an inner pipe 56. In this example, the intermingled (unignited) state of gas A from outer pipe 54 and gas B from inner pipe 56 is visualized.

Particles A prepared by impregnating the porous spherical silica particles obtained in Production Example 1 with Rhodamine 6G and drying the particles were fed to gas A.

Particles B prepared by impregnating the porous spherical silica particles prepared in Production Example 1 with coumarin 153 and drying the particles were fed to gas B.

Thereafter, an exciting light (XeCl excimer laser: 0.2 J/pulse) was projected against the fluids emerging from the nozzle 52 and using two CCD cameras (not shown), the particles A and B in gases A and B were respectively visualized.

Thus, through a filter transmitting light of the wavelength 610±20 nm (Nihon Shinku Kogaku) and an image intensifier (tradename C2925, Hamamatsu Photonics), the flow of particles A in gas A were visualized with a synchronized CCD camera.

On the other hand, through a filter transmitting light of the wavelength 540±30 nm (Nihon Shinku Kogaku) and an image intensifier (tradename C2925, Hamamatsu Photonics), the flow of particles B in gas B was visualized with a synchronized CCD camera.

The pattern of flow of particles A and that of particles B were synthesized by processing the data obtained from the above two CCD cameras. In this manner, the intermingled state of two different gases could be clearly visualized.

What is claimed is:

1. A method of measuring the velocity of fluid flow and visualizing the pattern of fluid flow comprising feeding fluorescent tracer particles of one kind to one fluid and feeding fluorescent tracer particles of another kind, which produce fluorescent emissions differing in wavelength from emissions from tracer particles of said one kind, to another fluid, mixing said one fluid with said other fluid, allowing the two fluids to converge and irradiating the resulting mixture of fluids with exciting light to cause said fluorescent tracer particles to produce fluorescent emissions and observing the fluid through a filter which does not transmit said exciting light but transmits said fluorescent emissions for visualization of the intermingled state of said fluids.

2. A method of measuring fluid flow according to claim 1, wherein said fluorescent tracer particles are tracer particles prepared by impregnating porous silica ($SiO_2$) particles with a liquid fluorescent substance and drying the impregnated particles.

3. A method of measuring fluid flow according to claim 1, wherein said fluorescent tracer particles are silica ($SiO_2$) particles treated with a lanthanoid or a compound thereof.

4. A method of measuring fluid flow according to claim 1, wherein said fluorescent tracer particles are prepared by impregnating porous particles with a liquid fluorescent substance and drying the impregnated particles.

5. A method of measuring fluid flow according to claim 4, wherein said fluorescent tracer particles are made of silica.

* * * * *